United States Patent

[11] 3,612,576

| [72] | Inventor | Melvin L. Marler<br>P.O. Box 325, Bremerton, Wash. 98310 |
|---|---|---|
| [21] | Appl. No. | 851,962 |
| [22] | Filed | Aug. 21, 1969 |
| [45] | Patented | Oct. 12, 1971 |

[54] TRAILER HITCH
3 Claims, 3 Drawing Figs.

[52] U.S. Cl. .................................................. 280/478 B,
280/475
[51] Int. Cl. .................................................. B60d 7/00
[50] Field of Search .......................................... 280/477,
478, 491

[56] References Cited
UNITED STATES PATENTS

| 2,451,660 | 10/1948 | Clark et al. ................... | 280/478 |
| 2,459,731 | 1/1949 | Wymore ....................... | 280/479 |
| 2,488,805 | 11/1949 | Clark et al. ................... | 280/477 |
| 2,973,971 | 3/1961 | Oddson ....................... | 280/478 (.2) |

*Primary Examiner*—Benjamin Hersh
*Assistant Examiner*—John P. Silverstrim
*Attorney*—Seed, Berry & Dowrey ABSTRACT: A trailer frame is provided with a box having horizontal upper and lower walls and rearwardly converging rear guide walls. A drawbar is telescopically mounted in said box and is provided with a caster at its rear end engageable with said converging guide walls and lateral stop members. The box is provided with a pair of laterally spaced pipes that are engageable with the drawbar to guide it during retraction and extension and also serve to limit outward movement of the drawbar. The box is also provided with lateral spacers engageable with the pipes when the drawbar is retracted to assure a tight connection.

PATENTED OCT 12 1971  3,612,576
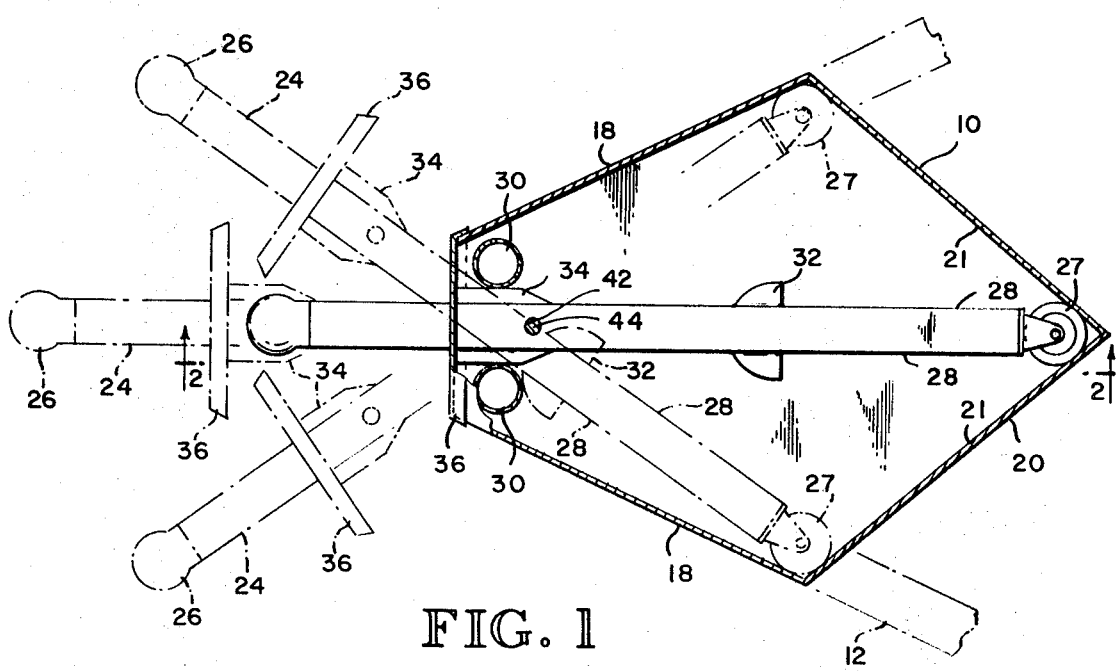
FIG. 1
FIG. 2
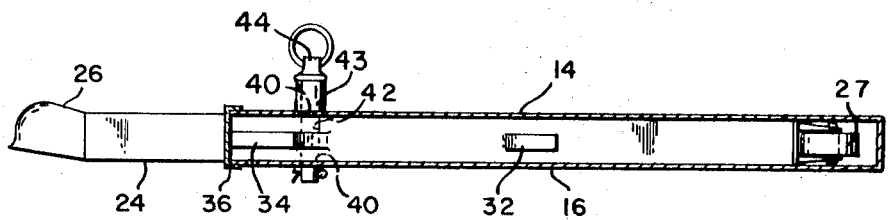
FIG. 3
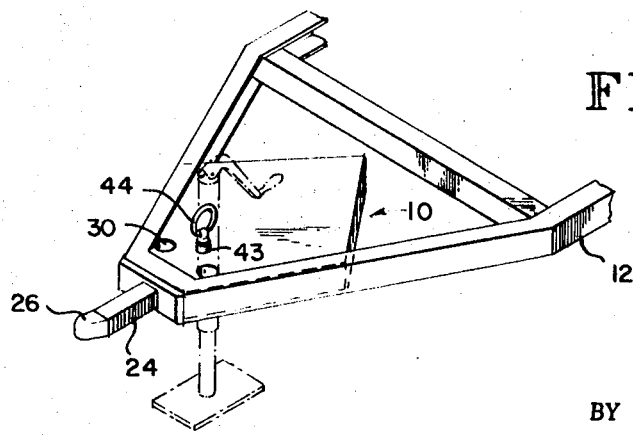
INVENTOR.
MELVIN L. MARLER
BY
ATTORNEYS

TRAILER HITCH

BACKGROUND OF THE INVENTION

1. Field of the Invention

This invention relates to vehicle couplers or hitches and, more particularly, to hitches having telescopic drawbars.

2. Description of the Prior Art

A difficulty in the use of trailers is that the operator must align the towing vehicle very accurately with respect to the trailer so that the drawbar of the trailer may be secured to the hook, pin or ball mounted on the towing vehicle. It is particularly a difficult problem for the operator of a pleasure trailer since the operator seldom uses the trailer frequently enough to become expert in positioning the towing vehicle.

Several solutions have been proposed for assisting in the alignment of the trailer and towing vehicle some of which use telescopic members which when extended have a certain amount of lateral freedom so that the towing vehicle may be inaccurately aligned and still be connected to the drawbar of the trailer. Once connected the towing vehicle may be moved toward the trailer with the telescopic member retracting and aligning the trailer relative to the towing vehicle. Typical of such prior art devices are illustrated in the patents to Hill et al. U.S Pat. No. 3,266,818, Lent U.S. Pat. No. 3,099,462 and Scrivner U.S. Pat. No. 3,169,028.

SUMMARY OF THE INVENTION

This invention pertains to a hitch structure having a telescopic drawbar which is uniquely constructed so as to reduce the loading on the hitch structure to a minimum so that costly maintenance and replacement are minimized. In the preferred form the hitch comprises box means secured to the trailer and having vertical guide surfaces and upper and lower walls that house a telescopically mounted drawbar. Bearing means are mounted at the forward end of the box means to engage the longitudinal sides of the drawbar and means are provided to limit outward movement of the telescopic drawbar and to lock the bar in place when retracted. When extended the forward end of the drawbar has a wide range of lateral movement. Bearing means are also provided on the rear end of the drawbar to engage with the guide surfaces of the box means for positioning the trailer as the towing vehicle moves the drawbar rearwardly into the box means. The box means and telescopic drawbar may be quickly installed in the conventional framework of a trailer as a substitute for the rigid drawbar customarily used.

BRIEF DESCRIPTION OF THE DRAWINGS

FIG. 1 is a top plan of a hitch device embodying the principles of the invention with parts broken away for clarity.

FIG. 2 is a vertical section taken along the line 2—2 of FIG. 1.

FIG. 3 is an isometric of the hitch device shown in FIG. 1.

DESCRIPTION OF THE PREFERRED EMBODIMENT

The box means 10 is welded or otherwise secured to the forward end of the trailer frame 12 and includes an upper horizontal wall or plate 14 and a lower horizontal wall or plate 16. The box means is open at its forward end and includes forward vertical sidewalls 18 and rearward sidewalls 20 defining rearwardly converging guide surfaces 21.

The drawbar 24 is provided with a conventional socket 26 at its forward end and bearing means in the form of a caster 27 at its rearward end. The longitudinal sides 28 of the drawbar define cam surfaces that are engageable with a pair of laterally spaced bearings, such as pipes 30, mounted at the forward end of the box means 10 between the upper and lower horizontal plates 14 and 16. The pipes may also be used to mount a conventional screw-type jack for lifting the trailer. Laterally extending stop members 32 are provided slightly to the rear of the midpoint of the drawbar and are engageable with the pipes 30 when the drawbar is extended to limit the extension of the drawbar. A pair of laterally extending spacers 34 are provided on the drawbar forward of its midpoint and along with the drawbar are of a combined width approximately equal to the spacing between the pipes 30. The drawbar being of lesser width to the rear of the spacers permits a large degree of lateral movement. As is readily apparent from FIG. 1 the spacers will fit snugly between the pipes when the drawbar is retracted to prevent lateral play between the drawbar and the box means. A vertical cover plate 36 is provided on the drawbar at the forward end of the spacers and serves to cover the opening in the forward end of the box means 10 when the drawbar is retracted. In addition, the cover 36 also assists in holding the drawbar against lateral movement when retracted.

The upper and lower horizontal plates 14 and 16 are each provided with an aperture 40 which mates with a vertical bore 42 in the drawbar 24 when the drawbar is fully retracted into the box means 10. A unique feature of the invention is the provision of a sleeve 43 secured to the upper horizontal plate 14 around the aperture 40. The sleeve holds a locking pin 44 in an upright position on the drawbar 24 so that it will automatically fall into the bore 42 to securely lock the drawbar within the box means 10. The spacing between the upper and lower horizontal plates 14 and 16 is approximately equal to the vertical thickness of the drawbar 24 so that the drawbar moves snugly within the box means 10.

In operation the towing vehicle is backed-up so that its hitch member is closely adjacent to socket 26 of the drawbar. The locking pin 44 is raised and the drawbar extended until the socket 26 fits over the ball on the towing vehicle. The front of the trailer is then lowered so that its weight is supported by the towing vehicle and the towing vehicle is backed toward the trailer. The caster 28 rides on the guide surfaces 21 of the box means 10 to straighten the box means on the drawbar 24. The pipes 30 allow the box means to smoothly transfer the load necessary to shift the trailer. When the drawbar is finally retracted fully the pin 44 will fall into the mating bore of the drawbar and is secured by a conventional cotter pin. The drawbar is thus rigidly held in the box means and may be used to tow the trailer in a conventional manner.

While the preferred form of the invention has been shown and described, various modifications will be apparent to those skilled in the art. It is understood, therefore, that the invention is to be limited only by a proper interpretation of the claims appended hereto.

The embodiments of the invention in which an exclusive property or privilege is claimed are defined as follows:

1. A trailer hitch comprising box means secured to the trailer and having rearwardly converging guide surfaces and upper and lower horizontal plates, a drawbar having longitudinal vertical sides telescopically mounted in said box means and being of a vertical thickness approximately equal to the spacing between said horizontal plates, said drawbar having bearing means at its rearward end engageable with said converging guide surfaces, forward bearing means mounted at the forward end of said box means spaced from the forward ends of said converging guide surfaces and engageable with the longitudinal vertical sides of said drawbar, stop means secured to the drawbar and spaced from said drawbar bearing means a distance at least as great as the distance between said forward bearing means and the forward ends of said rearwardly converging guide surfaces whereby extension of said drawbar is limited by said stop means so hat the drawbar bearing means is at all times in contact with said guide surfaces when the trailer is being moved into proper alignment by the drawbar interengagement with said forward bearing means and a converging guide surface, and removable locking means operable for preventing outward movement of said drawbar.

2. The trailer hitch defined by claim 1 wherein said drawbar is provided with lateral spacers engageable with said bearing means on the forward end of said box means for retaining said drawbar against lateral movement when retracted.

3. A trailer hitch comprising box means secured to the trailer end having laterally spaced guide surfaces, forward bearing means, and upper and lower horizontal walls;

a drawbar telescopically mounted in said box means and having longitudinal cam surfaces engageable with said forward bearing means and a rotatable bearing mounted on the rear end thereof for engagement with said guide surfaces;

stop means for limiting outward movement of said drawbar and removable locking means for preventing outward movement of said drawbar when engaged, said locking means including a sleeve secured to said upper horizontal wall, an aperture in said upper horizontal wall circumscribed by said sleeve, a vertical bore in said drawbar alignable with said aperture when said drawbar is fully retracted, a completely removable locking pin nested in said sleeve and aperture for automatically falling into said bore when said bore and aperture are aligned, and a substantially smooth upper surface on said drawbar surrounding said vertical bore for supporting a locking pin in said sleeve whereby the locking pin is supported by said drawbar upper surface until the vertical bore is aligned with the sleeve and aperture wherein said forward bearing means include vertical pipes adapted to receive a conventional trailer jack.